US012811492B2

(12) United States Patent
Hsieh et al.

(10) Patent No.: US 12,811,492 B2
(45) Date of Patent: Nov. 24, 2026

(54) POWER SUPPLY AND POWER FACTOR CORRECTION METHOD

(71) Applicant: Chicony Power Technology Co., Ltd., New Taipei City (TW)

(72) Inventors: Tsung-Ying Hsieh, New Taipei City (TW); I-Chun Yang, New Taipei City (TW)

(73) Assignee: Chicony Power Technology Co., Ltd., New Taipei City (TW)

( * ) Notice: Subject to any disclaimer, the term of this patent is extended or adjusted under 35 U.S.C. 154(b) by 77 days.

(21) Appl. No.: 19/095,020

(22) Filed: Mar. 30, 2025

(65) Prior Publication Data

US 2026/0149365 A1 May 28, 2026

(30) Foreign Application Priority Data

Nov. 28, 2024 (TW) ................................ 113146137

(51) Int. Cl.
*H02M 1/42* (2007.01)
*H02M 7/217* (2006.01)

(52) U.S. Cl.
CPC ......... *H02M 1/4208* (2013.01); *H02M 7/217* (2013.01)

(58) Field of Classification Search
CPC .......... H02M 1/12; H02M 1/32; H02M 1/322; H02M 3/3155; H02M 3/158; H02M 3/33507; H02M 3/33546; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552; H02M 7/1623; H02M 1/4225; H02M 3/33592;
(Continued)

(56) References Cited

U.S. PATENT DOCUMENTS 9,419,513 B2 8/2016 Mao et al.
2013/0094255 A1 4/2013 Yeh et al.
(Continued)

FOREIGN PATENT DOCUMENTS

CN 104660027 A 5/2015
CN 105071649 A 11/2015
(Continued)

*Primary Examiner* — Jeffrey A Gblende
(74) *Attorney, Agent, or Firm* — CKC & Partners Co., LLC

(57) ABSTRACT

A power supply comprising a conversion circuit, a measurement circuit and a control circuit. The conversion circuit is configured to convert an input voltage to an output voltage. The measurement circuit is configured to measure an input current of the input terminal. The measurement circuit is configured to calculate multiple harmonic parameters according to the input current, and the plurality of harmonic parameters corresponds to multiple harmonic frequencies. The control circuit is configured to generate multiple frequency multiplication signals corresponding to the multiple harmonic frequencies based on a frequency of the input voltage. When a change rate of the input current between multiple measurement intervals is greater than a preset value, the control circuit is configured to generate a current compensation signal according to the multiple frequency multiplication signals and the multiple harmonic parameters, and generate a control signal according to the current compensation signal.

20 Claims, 6 Drawing Sheets

(58) Field of Classification Search

CPC ........ H02M 3/073; H02M 3/10; H02M 3/135; H02M 3/137; H02M 7/10; H02M 7/00; H02M 7/06; H02M 7/064; H02M 7/068; H02M 3/156; H02M 7/5387; H02M 1/083; H02M 1/084; H02M 1/088; H02M 1/14; H02M 1/4216; H02M 1/4266; H02M 1/42; H02M 1/4241; H02M 1/425; H02M 1/4258; H02M 2001/4275; H02M 2001/4283; H02M 2001/4291; G05F 1/30; G05F 1/33; G05F 1/32; G05F 1/34; G05F 1/38; G05F 1/52; H02J 7/12

See application file for complete search history.

(56) References Cited

U.S. PATENT DOCUMENTS

| | | | | |
|---|---|---|---|---|
| 2014/0204614 | A1 | 7/2014 | Elam | |
| 2018/0006581 | A1* | 1/2018 | Ishihara | H02J 3/18 |
| 2018/0041119 | A1* | 2/2018 | Zhang | H02M 1/4225 |

FOREIGN PATENT DOCUMENTS

| | | | |
|---|---|---|---|
| CN | 106100373 | A | 11/2016 |
| CN | 107370358 | B | 3/2021 |
| CN | 112803750 | B | 7/2022 |
| CN | 113489305 | B | 7/2022 |
| CN | 114448251 | B | 6/2023 |
| JP | 2021132488 | A | 9/2021 |
| TW | 1357544 | B | 2/2012 |
| TW | I500245 | B | 9/2015 |
| TW | I625921 | B | 6/2018 |
| TW | I657649 | B | 4/2019 |

* cited by examiner

POWER SUPPLY AND POWER FACTOR CORRECTION METHOD

CROSS-REFERENCE TO RELATED APPLICATION

This application claims priority to Taiwan Application Serial Number 113146137, filed Nov. 28, 2024, which is herein incorporated by reference in its entirety.

BACKGROUND

Technical Field

The present disclosure relates to power control technology, and more particularly to a power supply and power factor correction method.

Description of Related Art

In a power supply with power factor correction (PFC), total harmonic distortion (THD) is a key indicator for evaluating the harmonic components in the current or voltage waveform. Excessive THD causes a variety of adverse effects, including increased power loss, reduced equipment efficiency, increased interference to the power grid, and shortened equipment lifespan. Therefore, there is a need for a control method that is easy to set up and apply to reduce the THD in the power supply.

SUMMARY

One aspect of the present disclosure is a power supply, comprising a conversion circuit, a measurement circuit and a control circuit. The conversion circuit is coupled to an input terminal, and is configured to convert an input voltage to an output voltage. The conversion circuit comprises a power switch, and the power switch is configured to adjust the output voltage according to a control signal. The measurement circuit is coupled to the input terminal, and is configured to measure an input current of the input terminal. The measurement circuit is configured to calculate a plurality of harmonic parameters according to the input current, and the plurality of harmonic parameters corresponds to a plurality of harmonic frequencies. The control circuit is coupled to the conversion circuit and the measurement circuit, and is configured to generate a plurality of frequency multiplication signals corresponding to the plurality of harmonic frequencies based on a frequency of the input voltage. When a change rate of the input current between a plurality of measurement intervals is greater than a preset value, the control circuit is configured to generate a current compensation signal according to the plurality of frequency multiplication signals and the plurality of harmonic parameters, and generate the control signal according to the current compensation signal.

Another aspect of the present disclosure is a power factor correction method, comprising: obtaining, by a measurement circuit, an input current of a conversion circuit; determining, by a control circuit, whether a change rate of the input current is greater than a preset value; receiving a plurality of harmonic parameters from the measurement circuit when the change rate of the input current is greater than a preset value, wherein the plurality of harmonic parameters corresponds to a plurality of harmonic frequencies; generating, by the control circuit, a plurality of frequency multiplication signals corresponding to the plurality of harmonic frequencies based on a frequency of an input voltage of the conversion circuit; and generating a current compensation signal according to the plurality of frequency multiplication signals and the plurality of harmonic parameters, and generating the control signal according to the current compensation signal, wherein the control signal is configured to control a power switch of the conversion circuit to adjust an output voltage of the conversion circuit.

Another aspect of the present disclosure is a power supply, comprising a conversion circuit, a measurement circuit and a control circuit. The conversion circuit is coupled to an input terminal, and is configured to convert an input voltage to an output voltage. The conversion circuit comprises a power switch, and the power switch is configured to adjust the output voltage according to a control signal. The measurement circuit is coupled to the input terminal, and is configured to measure an input current of the input terminal. The measurement circuit is configured to calculate a plurality of harmonic parameters according to the input current, and the plurality of harmonic parameters corresponds to a plurality of harmonic frequencies. The control circuit is coupled to the conversion circuit and the measurement circuit, and is configured to generate a plurality of frequency multiplication signals corresponding to the plurality of harmonic frequencies based on a frequency of the input voltage. The control circuit is configured to generate a plurality of current compensation signals sequentially according to each one of the plurality of frequency multiplication signals and a corresponding one of the plurality of harmonic parameters, and sequentially correct the control signal according to the plurality of current compensation signals.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes associated listed items or any and all combinations of more.

Figure 1:
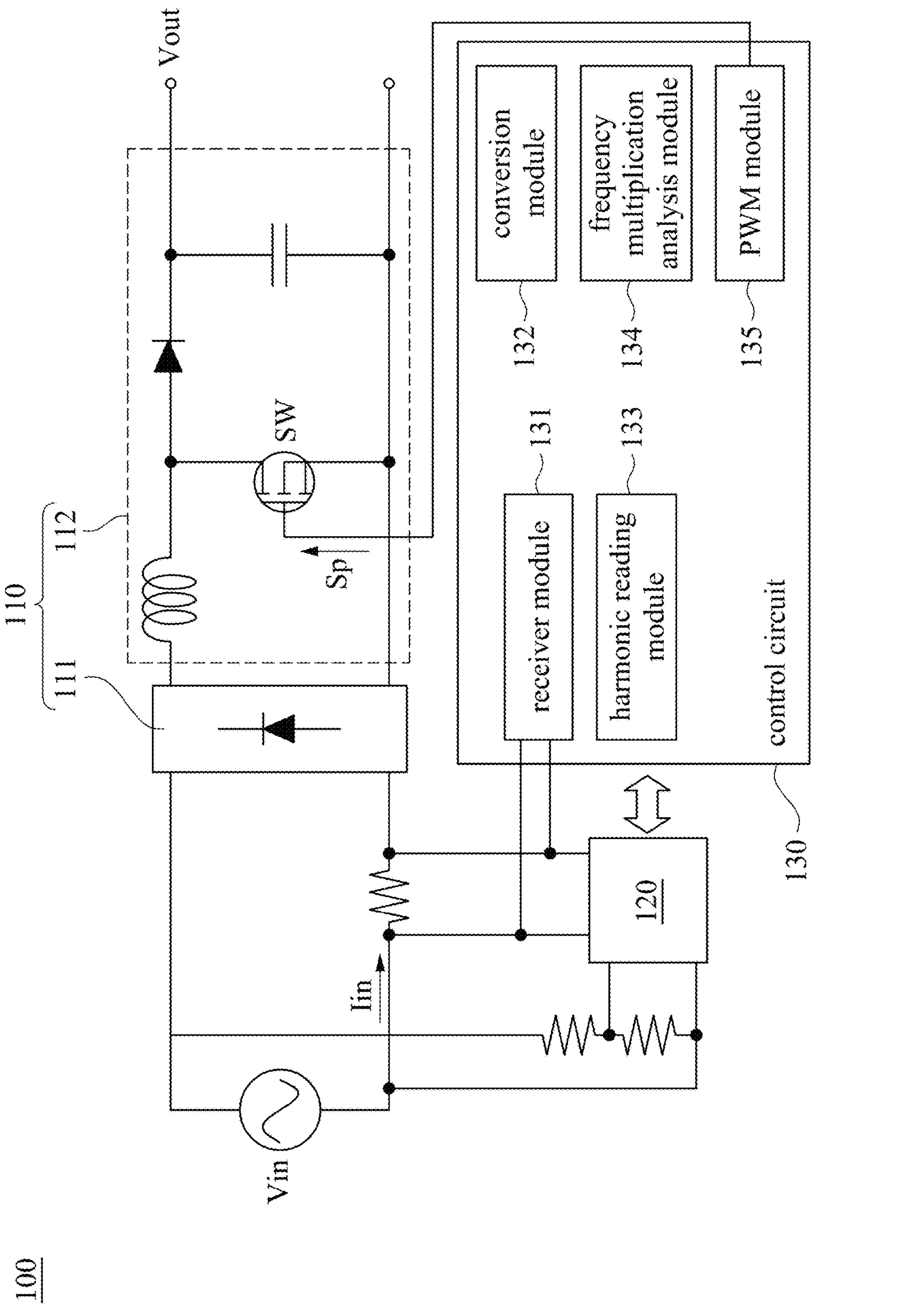
FIG. 1 is a schematic diagram of a power supply in some embodiments of the present disclosure.

The present disclosure relates to a power supply and a power factor correction method applied to the power supply. FIG. 1 is a schematic diagram of a power supply 100 in some embodiments of the present disclosure. The power supply 100 includes a conversion circuit 110, a measurement circuit 120 and a control circuit 130.

The conversion circuit 110 is coupled to an input terminal of the power supply 100 to receive an input voltage Vin from an input power source (e.g., mains electricity or pre-stage power supply equipment). The conversion circuit 110 is configured to convert the input voltage Vin to a specific operating voltage range and changes the phase of the voltage/current to generate an output voltage Vout.

In one embodiment, the conversion circuit 110 includes a rectifier circuit 111 and a boost circuit 112 (e.g., the inductor, capacitor and diode shown in FIG. 1). The boost circuit 112 includes a power switch SW. The power switch SW is controlled by a control signal Sp to adjust/control the phase and magnitude of the output voltage Vout.

In one embodiment, a filter may be provided in the conversion circuit 110 to reduce the total harmonic distortion (THD), but this approach will significantly increase the cost and also increase the overall volume of the power supply 100, so it is not ideal. The present disclosure dynamically adjusts the control signal Sp in a digital manner by the measurement circuit 120 and the control circuit 130 to improve THD.

The measurement circuit 120 is coupled to an input terminal of the power supply 100 and the conversion circuit 110, and is configured to measure an input current Iin of the input terminal. The measurement circuit 120 calculates multiple harmonic parameters of the input current Iin according to the input current Iin. Each of the harmonic parameters respectively corresponds to a specific harmonic frequency, and is configured to represent a harmonic ratio or harmonic component in the input signal.

Figure 2:
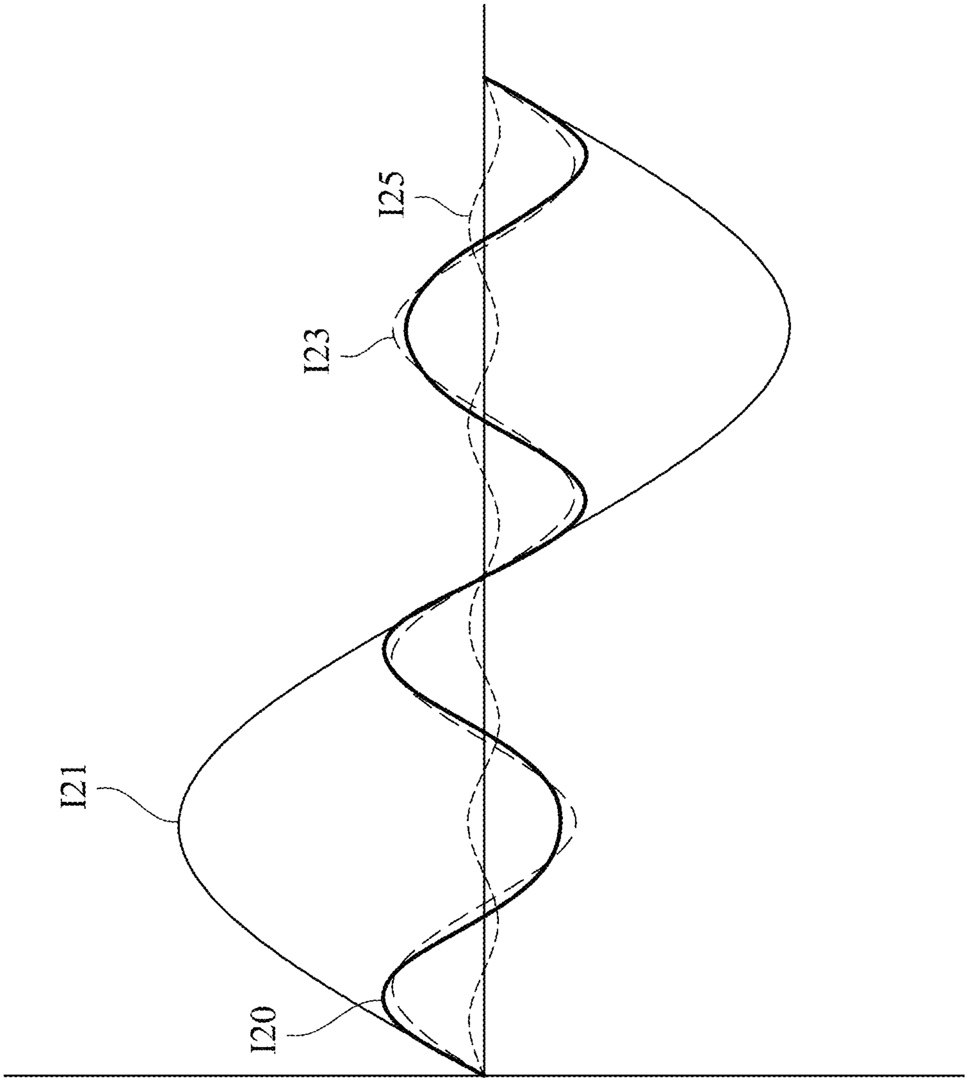
FIG. 2 is a schematic diagram of a waveform of the input current in some embodiments of the present disclosure.

Referring to FIG. 2, FIG. 2 is a schematic diagram of a waveform of the input current in some embodiments of the present disclosure. Ideally, the waveform of the input current should be a standard sine wave, as shown by the ideal current I21 (ideal current signal). However, in practical applications, due to factors such as load and non-ideal impedance, the input current will include distorted/non-ideal current components, namely the harmonic current I20. Therefore, the input current actually received by the power supply 100 will be the sum of "the ideal current I21 and the harmonic current I20", not the ideal sine wave. If a compensating current that is completely opposite to the waveform of the harmonic current I20 can be added to the input current, the input current can be compensated to an ideal state. In other words, in order to offset the undesirable harmonic current I20, another harmonic current that is completely opposite to the harmonic current I20 needs to be added to the actual input current to offset the undesirable effect.

However, since the harmonic current I20 usually has an irregular waveform (not an ideal sine wave as shown in FIG. 2), the harmonic current I20 must be decomposed to calculate the compensation current that is "completely opposite to the waveform of the harmonic current I20". As shown in FIG. 2, the harmonic current I20 can be decomposed into a combination of multiple sub-currents I23 and I25, and each of the frequency of the sub-currents I23, I25 (e.g., 180 Hz, 300 Hz) is an integer multiple of the frequency of the ideal current I21 (e.g., 60 Hz). The aforementioned "harmonic parameters" are the characteristic values of each sub-current in the harmonic current, such as frequency, size, intensity. The calculation method can use Fast Fourier Transform (FFT). Since those skilled in the art can understand the analysis method of the harmonic current, it will not be described in detail here.

The control circuit 130 is coupled to the conversion circuit 110 and the measurement circuit 120, and is configured to generate multiple frequency multiplication signals based on a frequency of the input voltage Vin. The frequencies of these frequency multiplication signals correspond to the harmonic frequencies of the harmonic parameters. That is, the waveform of the frequency multiplication signals correspond to the aforementioned sub-currents I23, I25. In other words, the aforementioned harmonic parameters are value after the harmonic is decomposed, and "the frequency multiplication signals" are waveforms after the harmonic is decomposed. The control circuit 130 generates a current compensation signal according to the harmonic parameters and the frequency multiplication signals, and further generates/adjusts the control signal Sp according to the current compensation signal.

Figure 3:
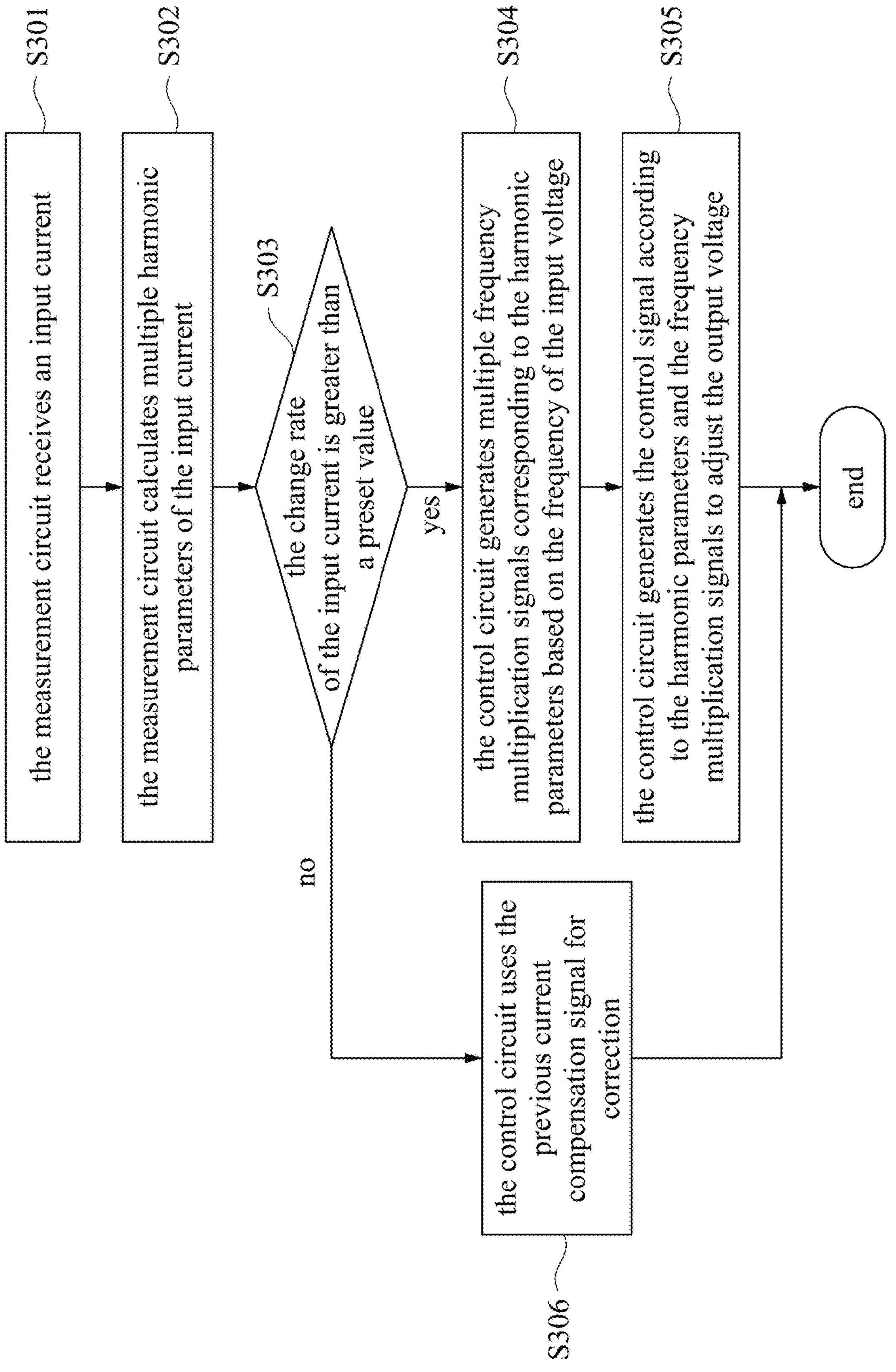
FIG. 3 is a flowchart illustrating a power factor correction method in some embodiments of the present disclosure.
Figure 4:
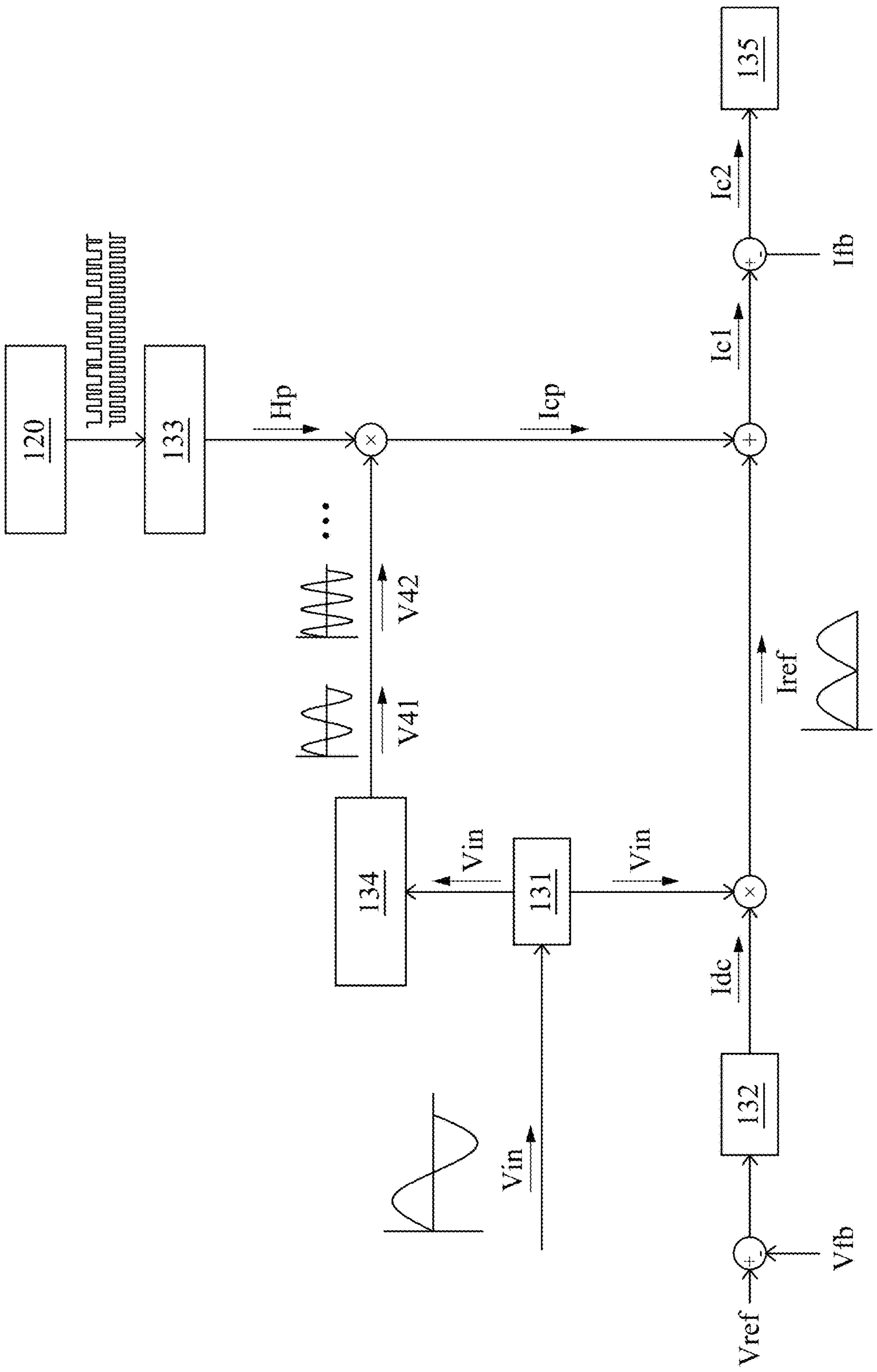
FIG. 4 is a schematic diagram of the operation of the power factor correction method in some embodiments of the present disclosure.

For ease of explanation, FIG. 3 and FIG. 4 are used as an example to explain the operation of the power supply 100 in FIG. 1 as follows. FIG. 3 is a flowchart illustrating a power factor correction method in some embodiments of the present disclosure. FIG. 4 is a schematic diagram of the operation of the power factor correction method in some embodiments of the present disclosure. In step S301, when the power supply 100 is operating, the conversion circuit 110 converts the input voltage Vin into the output voltage Vout, and the measurement circuit 120 measures an input current Iin and/or an input voltage Vin of the conversion circuit 110. In one embodiment, the control circuit 130 can obtain the input current Iin and/or the input voltage Vin through the receiver module 131.

At the same time, the control circuit 130 further generates a control signal Sp to control the power switch SW. Specifically, the control circuit 130 receives a feedback voltage Vfb (e.g., the output voltage Vout, or a voltage generated by the output voltage Vout after voltage division) from an output terminal of the conversion circuit 110, and compares the feedback voltage Vfb and a reference voltage Vref (e.g., an expected ideal voltage value), so as to calculate a deviation value of the output voltage. Then, the control circuit 130 generates an ideal DC signal Idc according to the deviation value by an conversion module 132.

Moreover, since the ideal DC signal Idc generated by the control circuit 130 is a direct current signal, the control circuit 130 further rectifies the input voltage Vin, and multiplies the rectified input voltage Vin with the ideal DC signal Idc to generate a reference correction current Iref that is rectified, as the ideal current I21 shown in FIG. 2. The reference correction current Iref can be matched with a current compensation signal Icp generated in the subsequent steps S304-S305 to determine the control signal Sp. In one embodiment, the control signal Sp is a pulse width modulation (PWM) signal, and the control circuit 130 is configured to dynamically adjust the duty cycle of the control signal Sp.

In step S302, the measurement circuit 120 calculates multiple harmonic parameters Hp of the input current Iin. As mentioned above, the harmonic parameters Hp are the characteristic components of the distorted signal after decomposition, and each of the harmonic parameters Hp corresponds to a different harmonic frequency. In one embodiment, the measurement circuit 120 calculates the harmonic parameters Hp through an internal harmonic reading module.

In step S303, the control circuit 130 determines whether a change rate of the input current Iin is greater than a preset value to determine whether the current compensation method needs to be changed. For example, the measurement circuit 120 calculates the difference of the input current Iin between multiple measurement intervals. If the difference of the input current Iin between a first measurement interval and a second measurement interval (i.e., the change rate) exceeds the preset value (e.g., the change ratio exceeds 10%), the subsequent steps S304-S305 are executed to change one or more current compensation signal(s) Icp. In one embodiment, the magnitude of "change rate" may be positively correlated with the conversion power of the conversion circuit 110. In addition, a time of any one of the "measurement interval" is greater than or equal to a voltage period of the input voltage Vin.

If the change rate of the input current Iin is larger than the preset value, it represents that the current correction method is not enough to effectively control THD and needs dynamic adjustment. In step S304, the control circuit 130 obtains the harmonic parameters Hp through the harmonic reading module 133, and generates the frequency multiplication signals corresponding to the harmonic parameters Hp based on the frequency of the input voltage Vin. As shown in FIG. 4, the control circuit 130 receives the input voltage Vin of the conversion circuit 110, and converts the input voltage Vin into multiple frequency multiplication signals V41, V42, etc. through a frequency multiplication analysis module 134 in the control circuit 130. In one embodiment, the frequency of each of the frequency multiplication signals V41, V42 (e.g., 120 Hz, 180 Hz) is an integer multiple of the frequency of the input voltage Vi n(e.g., 60 Hz), but the present disclosure is not limited thereto. The frequency multiplication signals V41, V42 are generated in the same way as shown in FIG. 2 above, so it will not be described here in detail.

In step S305, after obtaining the harmonic parameters Hp and the frequency multiplication signals V41, V42, the control circuit 130 generates one or more current compensation signal(s) Icp according to the harmonic parameters Hp and the frequency multiplication signals V41, V42, so as to generate the control signal Sp according to the current compensation signal Icp. As shown in FIG. 2, the current compensation signal Icp can be a signal with a waveform completely opposite to the harmonic current I20.

In addition, in some embodiments, the control circuit 130 is further configured to compare the current compensation signal(s) Icp and a feedback current Ifb received by the output terminal of the conversion circuit 110, so as to generate the correction current, and generate the control signal Sp according to the correction current. Specifically, as shown in FIG. 4, the control circuit 130 first adds the current compensation signal Icp and the reference correction current Iref to generate a correction current signal Ic1. Next, the control circuit 130 subtracts the feedback current Ifb from the correction current signal Ic1 to generate a current error signal Ic2. In other words, the current error signal Ic2 is a difference between the correction current signal Ic1 and the feedback current Ifb. The control circuit 130 generates the control signal Sp according to the current error signal Ic2 through the internal PWM (pulse width modulation) module 135, so as to adjust the output voltage Vout and/or the input current Iin so that the phase of the input signal (voltage/current) can match the phase of the output signal (voltage/current).

In step S306, if the change rate of the input current Iin is less than the preset value, it represents that the current correction method is enough to effectively control THD. Therefore, the control circuit 130 uses the previous current compensation signal Icp for correction, and does not receive the harmonic parameters Hp again. The control circuit 130 calculates a new current compensation signal Icp using the harmonic parameters Hp and the frequency multiplication signals V41, V42. Accordingly, it will be possible to avoid excessive computational load on the control circuit 130 while taking total harmonic distortion into account. For example, in the first measurement interval, the control circuit 130 generates the control signal Sp with at least one first current compensation signal. If the change rate of the input current Iin does not exceed the preset value during the second measurement interval, the control circuit 130 consistently uses the at least one first current compensation signal to generate the control signal Sp (i.e., uses the same at least one first current compensation signal to generate the control signal Sp).

It is important to mention here that the "first current compensation signal" in the first measurement interval is not limited to a single current compensation signal, but can also be the cumulative result of multiple current compensation signals, or can be multiple different current compensation signals provided sequentially in the first measurement interval.

The implementation details of the aforementioned step S305 are further described below. In some embodiments, the control circuit 130 sequentially generates multiple current compensation signals according to each of the frequency multiplication signals and the corresponding harmonic parameter. Then, the control circuit 130 sequentially corrects the control signal according to these current compensation signals. Thus, dynamic adjustment can be performed more quickly to improve THD in real time.

Specifically, as shown in FIG. 1 to FIG. 4, assuming the frequency of the input voltage Vin/the input current Iin is 60 Hz, the frequency multiplication signal V41 is a 120 Hz waveform (low-order harmonic signal), the frequency multiplication signal V42 is a 180 Hz waveform (high-order harmonic signal), and the harmonic parameters Hp include "120 Hz weight X, 180 Hz weight Y". The aforementioned weights X and Y can be determined according to the reading results of the harmonic reading module 133 and are not fixed values, such as 0.2 and 0.8. The control circuit 130 first generates the first current compensation signal using the frequency multiplication signals V41 with the lower frequency. This first current compensation signal will be directly output to operate with the reference correction current Iref to adjust/generate the control signal Sp (first control signal). Next, the control circuit 130 further adjusts/generates the second current compensation signal with the higher frequency multiplication signal V42 with the higher frequency to adjust the control signal Sp (second control signal) again. Accordingly, by adjusting the control signal Sp for each frequency multiplication signal sequentially, THD can be corrected more immediately.

In some embodiments, after adjusting/generating the control signal Sp (the first control signal) according to the frequency multiplication signals V41, the control circuit 130 will receive the harmonic components provided by the measurement circuit 120, and continue executing steps S304-S305, only after the voltage period of the input voltage Vin has passed. In other words, the control circuit 130 will wait for the voltage period of the input voltage Vin to pass, and then adjust/generate the control signal Sp (the second control signal) according to the frequency multiplication signals V42 with the higher frequency.

Figure 5A:
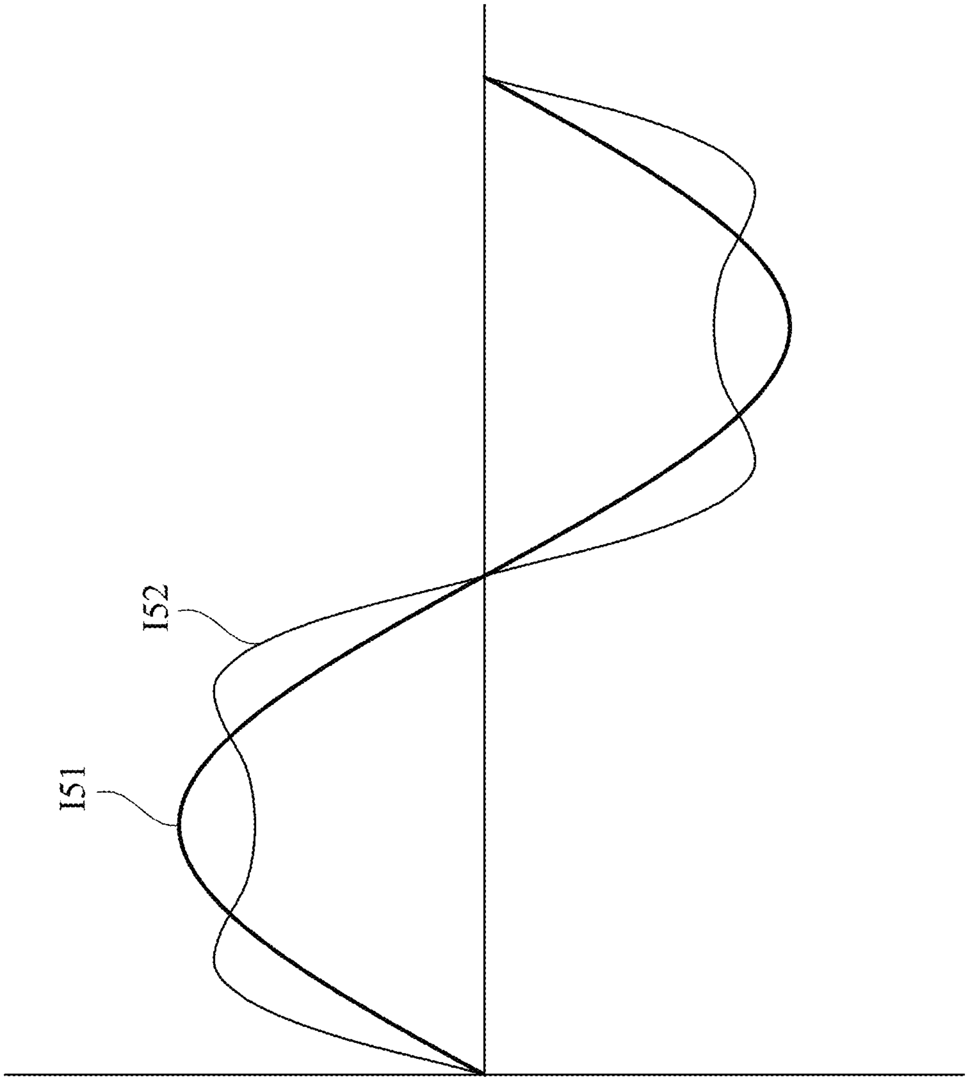
FIG. 5A is a schematic diagram of current waveforms in some embodiments of the present disclosure.
Figure 5B:
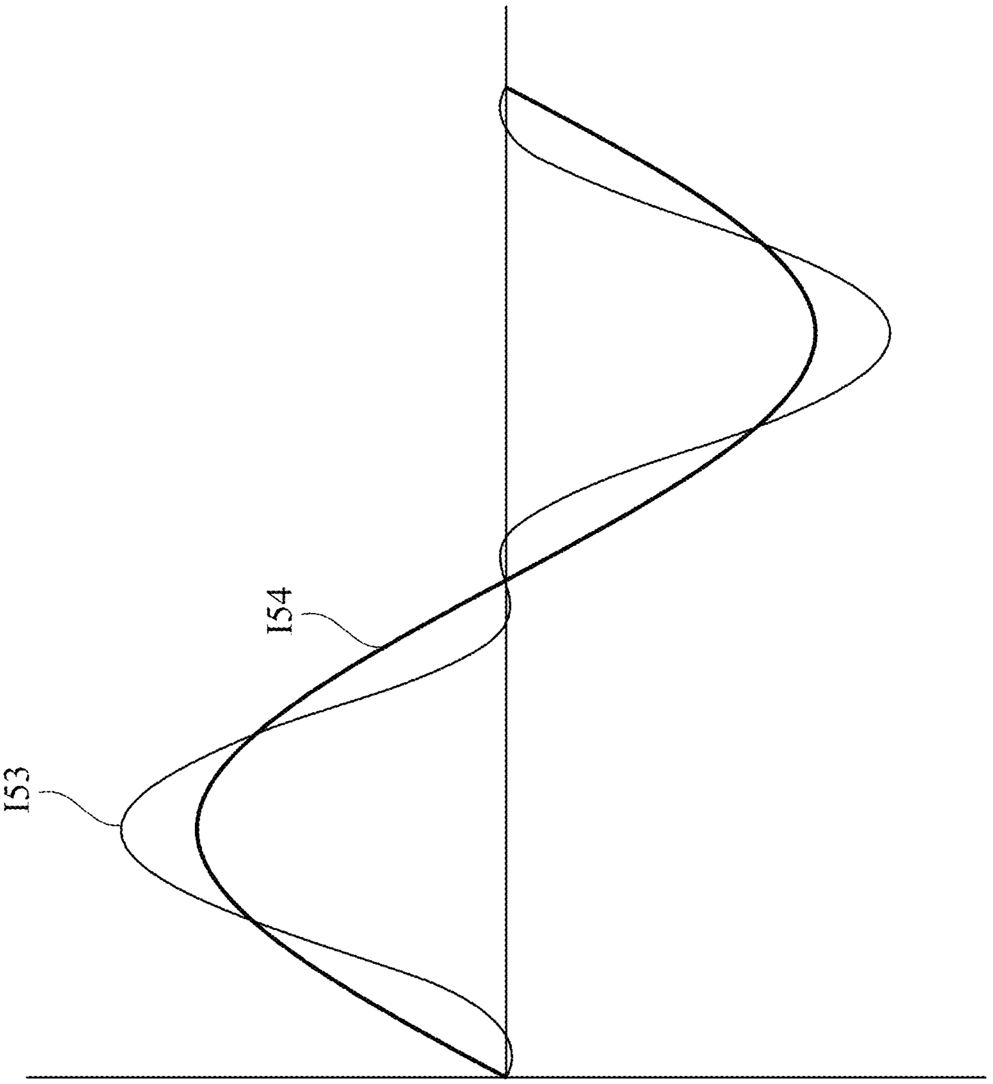
FIG. 5B is a schematic diagram of current waveforms in some embodiments of the present disclosure.

FIG. 5A and FIG. 5B are schematic diagrams of current waveforms in some embodiments of the present disclosure. As shown in FIG. 5A, the current signal I51 is an input command waveform generated without using the power factor correction method of the present disclosure. Although this waveform is an ideal sine wave, due to the existence of non-ideal factors in the circuit (i.e., harmonics), if the current signal I51 is directly used to control (e.g., as the correction current signal Ic1 in FIG. 4), the input current and the input voltage cannot be able to synchronize. As shown in the input current I53 of FIG. 5B, the input current I53 is not ideal.

On the other hand, after compensation/correction using the power factor correction method of the present disclosure (i.e., adding the current compensation signal Icp), the waveform of the current signal I52 is not an ideal sine wave. However, due to the existence of non-ideal factors in the circuit, by using the current signal I52 to control, the input current and the input voltage can synchronize with each other. As shown in the input current I54 of FIG. 5B, the input current I54 can be closer to an ideal sine wave.

The present disclosure can analyze the harmonic parameters instantly and automatically while the power supply is running, thereby effectively improving the control of THD. This control method does not require manual adjustment for different products and can be widely used in power supply devices of the same architecture, thus having better compatibility and stability.

In addition, by analyzing the change rate of the input current, the power supply will only dynamically adjust the correction method when the change rate is too large, and the control circuit can avoid excessive computational load caused by frequent corrections. Furthermore, when performing the correction, the power supply will generate the current compensation signal for each of the frequency multiplication signals respectively and sequentially to compensate instantly and quickly control THD.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A power supply, comprising:

a conversion circuit coupled to an input terminal, and configured to convert an input voltage to an output voltage, wherein the conversion circuit comprises a power switch, and the power switch is configured to adjust the output voltage according to a control signal;

a measurement circuit coupled to the input terminal, and configured to measure an input current of the input terminal, wherein the measurement circuit is configured to calculate a plurality of harmonic parameters according to the input current, and the plurality of harmonic parameters corresponds to a plurality of harmonic frequencies; and a control circuit coupled to the conversion circuit and the measurement circuit, and configured to generate a plurality of frequency multiplication signals corresponding to the plurality of harmonic frequencies based on a frequency of the input voltage;

wherein when a change rate of the input current between a plurality of measurement intervals is greater than a preset value, the control circuit is configured to generate a current compensation signal according to the plurality of frequency multiplication signals and the plurality of harmonic parameters, and generate the control signal according to the current compensation signal.

2. The power supply of claim 1, wherein the current compensation signal comprises a first current compensation signal and a second current compensation signal, and the control circuit is configured to receive a feedback voltage from the conversion circuit to generate an ideal current signal according to the feedback voltage; and wherein the control circuit is configured to generate the first current compensation signal and the second current compensation signal according to the plurality of frequency multiplication signals and the plurality of harmonic parameters, and is configured to add the first current compensation signal and the second current compensation signal to the ideal current signal sequentially to adjust the control signal sequentially.

3. The power supply of claim 2, wherein the plurality of frequency multiplication signals comprises a low-order harmonic signal and a high-order harmonic signal, the control circuit is configured to first generate a first control signal according to the low-order harmonic signal, and then generate a second control signal according to the high-order harmonic signal.

4. The power supply of claim 1, wherein the plurality of measurement intervals comprises a first measurement interval and a second measurement interval, and the control circuit generates the control signal by using at least one first current compensation signal in the first measurement interval; and when the change rate of the input current between the first measurement interval and the second measurement interval is less than the preset value, the control circuit consistently uses the at least one first current compensation signal to generate the control signal.

5. The power supply of claim 4, wherein a time of any one of the first measurement interval and the second measurement interval is greater than or equal to a voltage period of the input voltage.

6. The power supply of claim 1, wherein the control circuit is configured to compare the current compensation signal and a feedback current of the conversion circuit to generate a correction current, and generate the control signal according to the correction current.

7. The power supply of claim 1, wherein a frequency of the plurality of frequency multiplication signals is an integer multiple of the frequency of the input voltage.

8. A power factor correction method, comprising:

obtaining, by a measurement circuit, an input current of a conversion circuit;

determining, by a control circuit, whether a change rate of the input current is greater than a preset value;

receiving a plurality of harmonic parameters from the measurement circuit when the change rate of the input current is greater than a preset value, wherein the plurality of harmonic parameters corresponds to a plurality of harmonic frequencies;

generating, by the control circuit, a plurality of frequency multiplication signals corresponding to the plurality of harmonic frequencies based on a frequency of an input voltage of the conversion circuit; and generating a current compensation signal according to the plurality of frequency multiplication signals and the plurality of harmonic parameters, and generating a control signal according to the current compensation signal, wherein the control signal is configured to control a power switch of the conversion circuit to adjust an output voltage of the conversion circuit.

9. The power factor correction method of claim 8, wherein the current compensation signal comprises a first current compensation signal and a second current compensation signal, and generating the current compensation signal according to the plurality of frequency multiplication signals and the plurality of harmonic parameters, and generating the control signal according to the current compensation signal comprises:

receiving a feedback voltage from the conversion circuit to generate an ideal current signal according to the feedback voltage; and adding the first current compensation signal and the second current compensation signal to the ideal current signal sequentially to adjust the control signal sequentially.

10. The power factor correction method of claim 9, wherein adding the first current compensation signal and the second current compensation signal to the ideal current signal sequentially to adjust the control signal sequentially comprises:

generating a first control signal according to a low-order harmonic signal of the plurality of frequency multiplication signals first, and then generating a second control signal according to a high-order harmonic signal of the plurality of frequency multiplication signals.

11. The power factor correction method of claim 8, wherein determining whether the change rate of the input current is greater than the preset value comprises:

calculating a difference of the input current between a first measurement interval and a second measurement interval as the change rate, wherein the control circuit generates the control signal by using at least one first current compensation signal in the first measurement interval; and when the change rate is less than the preset value, consistently using the at least one first current compensation signal to generate the control signal.

12. The power factor correction method of claim 11, wherein a time of any one of the first measurement interval and the second measurement interval is greater than or equal to a voltage period of the input voltage.

13. The power factor correction method of claim 8, wherein generating the current compensation signal according to the plurality of frequency multiplication signals and the plurality of harmonic parameters, and generating the control signal according to the current compensation signal comprises:

comparing the current compensation signal and a feedback current of the conversion circuit to generate a correction current; and generating the control signal according to the correction current.

14. The power factor correction method of claim 8, wherein a frequency of the plurality of frequency multiplication signals is an integer multiple of the frequency of the input voltage.

15. A power supply, comprising:

a conversion circuit coupled to an input terminal, and configured to convert an input voltage to an output voltage, wherein the conversion circuit comprises a power switch, and the power switch is configured to adjust the output voltage according to a control signal;

a measurement circuit coupled to the input terminal, and configured to measure an input current of the input terminal, wherein the measurement circuit is configured to calculate a plurality of harmonic parameters according to the input current, and the plurality of harmonic parameters corresponds to a plurality of harmonic frequencies; and a control circuit coupled to the conversion circuit and the measurement circuit, and configured to generate a plurality of frequency multiplication signals corresponding to the plurality of harmonic frequencies based on a frequency of the input voltage;

wherein the control circuit is configured to generate a plurality of current compensation signals sequentially according to each one of the plurality of frequency multiplication signals and a corresponding one of the plurality of harmonic parameters, and sequentially correct the control signal according to the plurality of current compensation signals.

16. The power supply of claim 15, wherein the plurality of frequency multiplication signals comprises a low-order harmonic signal and a high-order harmonic signal, the control circuit is configured to first generate a first control signal according to the low-order harmonic signal, and then generate a second control signal according to the high-order harmonic signal.

17. The power supply of claim 16, wherein after the control circuit generates the first control signal according to the low-order harmonic signal, the control circuit generates the second control signal only after a voltage period of the input voltage has passed.

18. The power supply of claim 15, wherein the control circuit corrects the control signal by using at least one first current compensation signal in a first measurement interval, and in a second measurement interval, when a change rate of the input current is less than a preset value, the control circuit consistently uses the at least one first current compensation signal to correct the control signal.

19. The power supply of claim 15, wherein the control circuit is configured to compare the plurality of current compensation signals and a feedback current of the conversion circuit to generate a correction current, and generate the control signal according to the correction current.

20. The power supply of claim 15, wherein a frequency of the plurality of frequency multiplication signals is an integer multiple of the frequency of the input voltage.

* * * * *